April 17, 1928.  
A. SHEBERASHENKO  
RADIUS TOOL  
Filed April 10, 1925
1,666,109
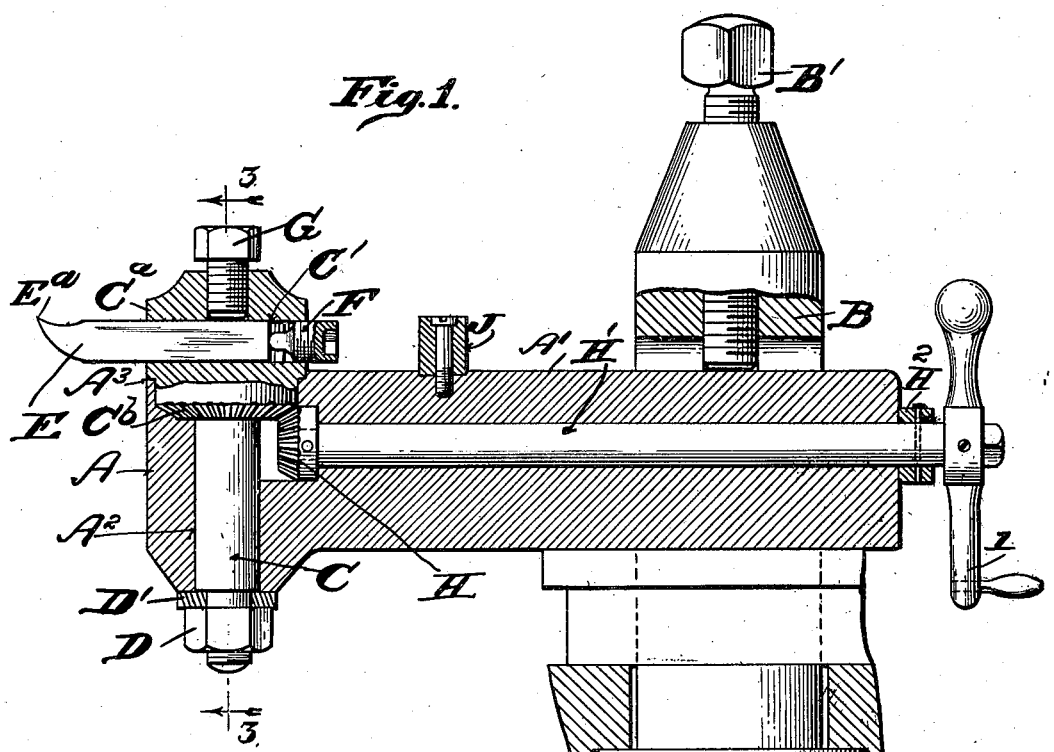
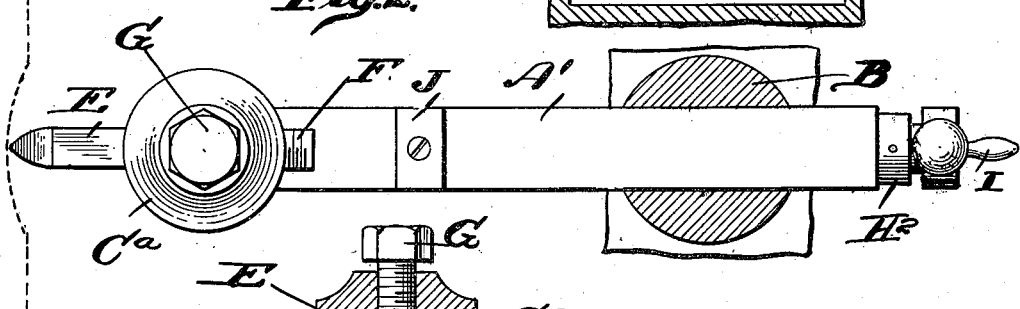
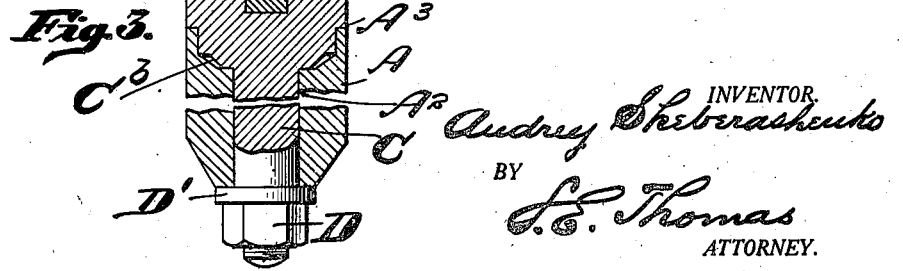
INVENTOR.  
Audrey Sheberashenko  
BY  
J.E. Thomas  
ATTORNEY.

Patented Apr. 17, 1928.

1,666,109

UNITED STATES PATENT OFFICE.

ANDREY SHEBERASHENKO, OF DETROIT, MICHIGAN.

RADIUS TOOL.

Application filed April 10, 1925. Serial No. 22,115.

My invention relates to radius tools adapted to be supported in a suitable tool post, shown in the accompanying drawings and more particularly described in the following specification and claim.

The object of my invention is to provide a device adapted to be supported in a tool post in which the cutting tool may be accurately adjusted to cut radial peripheral grooves of varying width—the construction being such that by the aid of a micrometer an accurate adjustment of the cutting tool may be obtained to secure grooves of any required size.

A further object of the invention is to provide a tool of inexpensive construction, simple in operation and not apt to wear rapidly, or get out of order.

With the foregoing and other objects in view which will appear as the description proceeds the invention further resides in the combination and arrangement of parts and in the details of construction hereinafter described and claimed it being understood that changes may be made in the precise embodiment of the invention herein disclosed without departing from the spirit of the same.

In the drawings accompanying this specification:

Figure 1 is a vertical cross-sectional view through the device mounted in a lathe tool post of usual construction.

Figure 2 is a plan view of the device supported in a tool post—a fragment of the post being indicated in horizontal section.

Figure 3 is a vertical cross-sectional view with parts in elevation, taken on or about line 3—3 of Figure 1.

Referring now to the letters of reference placed upon the drawings:

The tool stock A is provided with a lateral projecting shank $A^1$ supported in a tool post B by a set screw $B^1$ projecting downwardly from the top of the post.

The tool stock has a bore $A^2$ to receive a spindle C having an enlarged head $C^a$—with a gear $C^b$ below—seated against an annular shoulder $A^3$ in the tool stock surrounding the bore.

The lower projecting end of the spindle is relatively smaller in diameter than the bore through the tool stock and is screw-threaded and fitted with a nut D and washer $D^1$ overlapping the end of the tool stock to maintain the parts in proper position.

The enlarged head $C^a$ of the spindle has a transverse hole $C^1$ to receive a cutting tool E, which may be accurately adjusted by a set-screw F fitted in the end of the transverse hole, before securing the tool by the bolt G screwed into the head of the spindle.

In mesh with the gear $C^b$ is a gear H fitted upon the end of a shaft $H^1$ journalled in a bore extending longitudinally through the shank $A^1$, its projecting end being fitted with a washer $H^2$ pinned to the shaft and a suitable crank arm I, for manually operating the gear, secured by a pin and nut to the shaft.

J is a block attached to the laterally projecting shank $A^1$ of the tool stock—directly back of the cutting tool.

To determine the necessary adjustment of the cutting tool to secure any predetermined radii—for example, a radius of two inches, a suitable micrometer is employed in conjunction with the tool and adjusted to extend from the end of the cutting tool $E^a$ to the edge of the block J—the micrometer reading being two inches plus the radii of the tool stock. The cutting tool being adjusted for a predetermined radius, it is secured in the rotatable spindle by the set screw G, and may be actuated by the crank arm I through the rotation of the gears H and $C^b$ carried by the respective spindles.

Having thus described my invention what I claim is:

A radius tool comprising a tool stock having a laterally projecting shank and provided therein with a longitudinal bore extending from one end of the shank and terminating at the tool stock interiorly thereof, said tool stock being provided with a vertical bore intersected by the said longitudinal bore and enlarged at its upper end, the enlarged end being surrounded by an annular shoulder, a vertical spindle having an enlarged head seated on the annular shoulder of the stock and fitting in the enlarged portion of the vertical bore and entirely filling the same and provided at its lower face below said annular shoulder with a horizontal gear, a horizontal spindle mounted in the longitudinal bore and provided at its inner end with a gear meshing with the said gear, means for mounting a tool on the enlarged head of the vertical spindle, and means for rotating the horizontal spindle.

In testimony whereof, I sign this specification.

ANDREY SHEBERASHENKO.